Sept. 13, 1927.
O. HOVDEN
1,642,442
FISH HEAD AND ENTRAILS REMOVING MEANS
Filed July 8, 1925
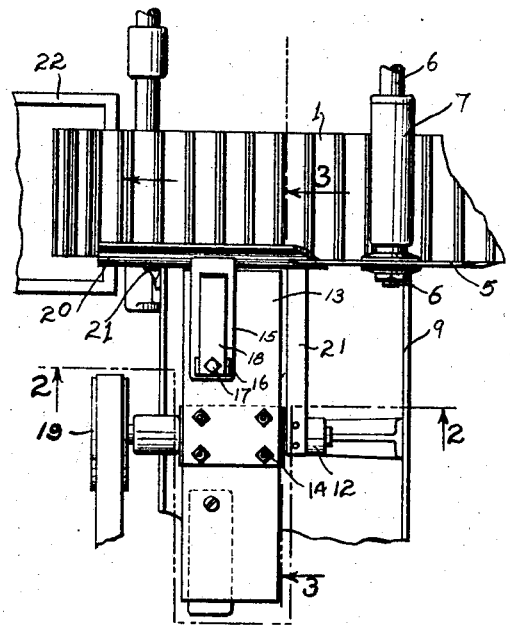
FIG 1
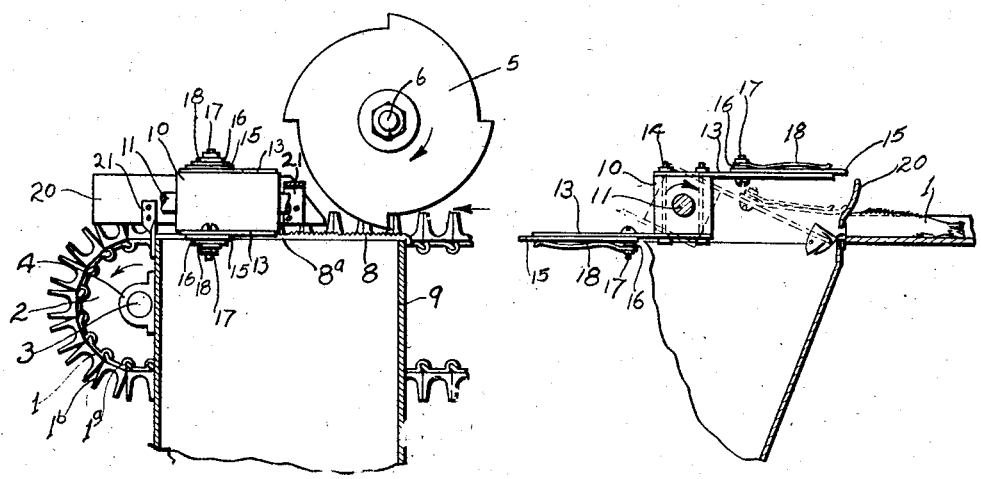
FIG 2
FIG 3
Inventor
OLAV HOVDEN
By A. B. Bowman
Attorney Patented Sept. 13, 1927.

1,642,442

UNITED STATES PATENT OFFICE.

OLAV HOVDEN, OF MONTEREY, CALIFORNIA.

FISH HEAD AND ENTRAILS REMOVING MEANS.

Application filed July 8, 1925. Serial No. 42,210.

My invention relates to a fish head and entrail removing means.

The primary object of my invention is to provide improvements over my previous application for Letters Patent for fish beheading and entrail removing machines, filed in the United States Patent Office, July 9, 1923, under Serial Number 650,415. Other objects of my invention are: First, to provide a means of this class whereby the heads of fish previously partially cut off behind the heads at the backs and under sides may be removed by impact and whereby the entrails of the fish not removed with the head and extending beyond the body of the fish may be similarly removed by a yieldable member in connection with the impact head removing means; second, to provide an impact fish head removing means having a yieldable fish entrail removing member in connection therewith adapted to be retarded in a portion of its path, thereby storing up momentum prior to engaging the entrails extending beyond the ends of beheaded fish for removing the same therefrom; third, to provide a means of this class whereby the entrails of fish may be completely, easily and economically removed without handling the fish and without unnecessarily mutilating the same; fourth, to provide a novelly constructed fish head and entrail removing means, and fifth, to provide a means of this class which is simple and economical of construction, durable, efficient, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a plan view of my fish head and entrail removing means shown in connection with a fragmentary portion of a fish segregating, conveying and incising means; Fig. 2 is a side elevational view thereof, taken at 2—2 of Fig. 1, showing certain parts and portions thereof broken away and in section to facilitate the illustration, and Fig. 3 is a fragmentary transverse sectional view thereof, taken through 3—3 of Fig. 1.

Like characters of reference refer to similar parts and portions throughout the several views of the drawings.

The conveyer 1, sprockets 2, shafts 3, journals 4, cutting member 5, spindle 6, journal 7, cutting member 8, bin 9, head member 10, shaft 11, journals 12, fish head removing paddles 13, bolts 14, yieldable entrail removing members 15, plates 16, bolts 17, spring plates 18, pulley 19, guard 20, guard supports 21, and the bin 22, constitute the principal parts and portions of my fish head and entrail removing structure.

The conveyer 1 is a continuous conveyer provided with transversely extending channels or pockets adapted to receive fish lengthwise therein and consists of a plurality of channel or pocket members $1^b$ secured on their back sides to a link chain $1^a$. Said conveyer is mounted at its ends (one end only being shown) on sprockets 2 which are secured to shafts 3 revolubly mounted in journals 4. At the side and intermediate the ends of the conveyer 1 is positioned a cutting member 5 which is secured to the end of a spindle 6 revolubly mounted in a journal 7. The cutting edges of the cutting member 5 are positioned just beyond those ends of the channels or pockets of the conveyer in which fish are positioned with their backs uppermost and with their head ends extending beyond the channels or pockets at which the cutting member is positioned. The lower cutting edge or edges of the cutting member 5 extends to within a short distance of the bottom of the channels or pockets in the conveyer, and therefore cut only through the backs of the fish. Positioned directly below the cutting member 5 and extending forwardly therefrom is the combination cutting and fish retaining member 8, which may be secured to the upper edge of the bin 9, substantially as shown. The portion of the member 8 directly below the revoluble cutting member 5 is provided with a cutting edge which consists of small sharp saw teeth which extend a short distance above the lower portions or bottoms of the channels or pockets of the conveyer and are spaced below the lower portion of the cutting member 5, leaving a space between the cutting edges thereof and of the cutting member 5, so that the entrails of the fish will not be incised. There are preferably no cutting teeth at the forward portion $8^a$ of the cutting and retaining member 8, but this porion is made smooth so that the entrails will not be torn or ruptured when being removed from the body of the fish. The smooth portion 8ª also extends above the bottoms of the channels of the conveyer so as to retain the bodies of the fish on the conveyer when their heads are removed.

The bin 9 for receiving the fish heads and entrails is positioned at the side of the conveyer below the cutting members 5 and 8. At the upper portion of the bin 9 and directly over the same is mounted an impact means in the form of a paddle wheel for separating the heads and entrails from the body or edible portions of the fish by impact. The impact means consists of a rectangular head member 10 to the opposite sides of which are secured, by means of bolts 14, plates or paddles 13 which extend tangentially therefrom relatively to its axis, the outer ends of the plates or paddles 13 being adapted to engage the heads of the fish partly cut off from the body or edible portions by the cutting members 5 and 8. The head member 10 is mounted on a shaft 11 which is revolubly mounted in journals 12 supported at the upper portion of the bin 9. At the outer sides of the paddles 13, intermediate their ends, are secured one end of each of the yieldable entrail removing members 15, by means of plates 16 and bolts 17. The members 15 are preferably made of a readily yieldable material, such as leather belting, the outer ends of the members 15 extending a slight distance beyond the outer ends of the paddles 13, as shown best in Fig. 3. At the outer sides of the yieldable entrail removing members 15 are positioned leaf springs 18, the ends of which nearest the head 10 are secured to the members 15 and paddles 13 by means of the bolts 17. The outer or free ends of the springs 18 are spaced from the free ends of the members 15, and are adapted for normally retaining the outer ends of the members 15 against the outer sides of the paddles 13, as shown by solid lines in Fig. 3. The impact means, just described, may be rotated by a pulley 19 secured to the shaft 11.

At the side of the conveyer 1 at which the cutting members 5 and 8 are positioned and slightly spaced from the conveyer and extending forwardly from the cutting member 5 is a fish retaining member or guard 20 which is curved upwardly and inwardly from its lower edge over the conveyer 1 and thence upwardly, as shown best in Fig. 3.

As the fish with their heads partially cut off by the cutting members 5 and 8 and hanging down, as shown in Fig. 3, are moved along by the conveyer 1, the same pass under the lower edge of the member 20 where the heads are removed by impact from the paddles 13, the members 20 and 8 retaining the body or edible portions of the fish in the pockets of the conveyer, and are carried to the forward end thereof from which they are discharged into the bin 22.

Although the entrails are not cut by the cutting members 5 and 8, the same are not always removed from the bodies of the fish with the heads, but hang down into the bin 9. As the impact means is rotated in the direction of the arrow, the outer ends of the yieldable members 15 engage one at a time the lower rounded portion of the fish retaining member or guard 20, permitting the same to be separated, against the compression of the spring 18 from the outer sides of the paddles 13, as indicated by dotted lines in Fig. 3. As the impact means continues to rotate, the outer end of the yieldable member 15 is automatically released from the guard 20 and permitted to engage with a swiping blow the entrails of the fish hanging downwardly into the bin 9, completely removing the same from the body of the fish.

The fish retaining member or guard 20 is held in the position stated by the supporting members 21, as shown best in Fig. 1.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a means of the class described, a movable conveyer having transverse pockets and a revoluble means, provided with relatively yieldable and flexible portions mounted at the side of said conveyer and continguous thereto said relatively yieldable and flexible portions being adapted to engage a portion of the product carried in the pockets of said conveyer.

2. In a means of the class described, a pocket conveyer, a supporting member revolubly mounted at the side of said conveyer, and a yieldable member resiliently supported on said supporting member adapted to engage and remove the entrails of fish carried in the pockets of said conveyer.

3. In a means of the class described, a conveyer, a chute positioned at one side of and extending below said conveyer, a curved fish retaining member positioned at said side of said conveyer above the upper portion of said chute, a supporting member revolubly mounted at said side of the conveyer, and a yieldable member resiliently supported on said supporting member adapted to engage and be retarded in its revoluble movement by said retaining member and released therefrom to engage the entrails of fish extending from the fish carried by said conveyer into said chute.

4. In a means of the class described, a conveyer, a chute positioned at one side of and extending below said conveyer, a curved fish retaining member positioned at said side of said conveyer above the upper portion of said chute, a paddle wheel revolubly mounted at said side of said conveyer adapted to engage the heads of fish carried by said conveyer and remove the same from the bodies of said fish, yieldable members secured at their one ends to the outer sides and intermediate the ends of the paddles of said paddle wheel, the outer ends of said yieldable members extending beyond the outer ends of said paddles, and means at the outer ends of said yieldable members and the paddles of said paddle wheel for resiliently retaining the former against the latter.

5. In a means of the class described, a conveyer, a chute positioned at one side of and extending below said conveyer, a curved fish retaining member positioned at said side of said conveyer above the upper portion of said chute, a paddle wheel revolubly mounted at said side of said conveyer adapted to engage the heads of fish carried by said conveyer and remove the same from the bodies of said fish, and yieldable members secured at their one ends to the outer sides and intermediate the ends of the paddles of said paddle wheel.

6. In a means of the class described, a fish supporting means, a paddle wheel revolubly mounted at one side of said supporting means and adapted to engage the heads of fish adapted to be carried thereon, yieldable members secured at their one ends to the outer sides and intermediate the ends of the paddles of said paddle wheel, the outer ends of said yieldable members extending beyond the outer ends of said paddles, and means at the outer ends of said yieldable members and the paddles of said paddle wheel for resiliently retaining the former against the latter.

7. In a means of the class described, a movable conveyer having transverse pockets and a support movably mounted at one side of said conveyer, said support having yieldable and resilient means adapted to pass intermittently past said side of said conveyer for engaging and removing a portion of the members carried in said pockets.

In testimony whereof, I have hereunto set my hand at Monterey, California this 5th day of May, 1925.

OLAV HOVDEN.